US008583600B2

(12) United States Patent
Hazlewood et al.

(10) Patent No.: US 8,583,600 B2
(45) Date of Patent: Nov. 12, 2013

(54) DEPLOYING DIRECTORY INSTANCES (75) Inventors: Kristin Marie Hazlewood, Austin, TX (US); Shevaun-Ann Michelle Fontenot, Cedar Park, TX (US); Yogesh Vilas Golwalkar, Maharastra (IN); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 12/061,695

(22) Filed: Apr. 3, 2008

(65) Prior Publication Data
US 2009/0254579 A1 Oct. 8, 2009

(51) Int. Cl.
G06F 7/00 (2006.01)
G06F 17/00 (2006.01)
G06F 13/14 (2006.01)

(52) U.S. Cl.
USPC ........................................... 707/651

(58) Field of Classification Search
USPC .................. 709/206, 229, 248; 707/999.001, 707/999.003, 999.201–204, 610, 999.1, 707/611, 651; 380/28, 44–46, 223, 273, 380/286; 713/160–189; 726/26–27, 4, 30; 717/100–174; 382/115
See application file for complete search history.

(56) References Cited

U.S. PATENT DOCUMENTS

| 5,983,240 | A  | * | 11/1999 | Shoroff et al. ........................ 1/1 |
| 6,567,818 | B1 |   | 5/2003  | Frey et al. |
| 6,973,463 | B2 | * | 12/2005 | Merrells et al. ....................... 1/1 |
| 7,203,700 | B1 | * | 4/2007  | Kumar et al. ......................... 1/1 |
| 7,321,904 | B2 | * | 1/2008  | Holenstein et al. ................... 1/1 |
| 7,634,514 | B2 | * | 12/2009 | Langan et al. ......................... 1/1 |
| 7,770,228 | B2 | * | 8/2010  | Carpentier et al. ............. 726/30 |
| 7,882,062 | B2 | * | 2/2011  | Holenstein et al. ........... 707/610 |
| 2004/0019898 | A1 |   | 1/2004 | Frey et al. |
| 2005/0204356 | A1 |   | 9/2005 | Sundararajan et al. |
| 2009/0150398 | A1 | * | 6/2009 | Raut ............................. 707/10 |
| 2009/0196417 | A1 | * | 8/2009 | Beaver et al. .................. 380/45 |

* cited by examiner

Primary Examiner — Usmaan Saeed
Assistant Examiner — Cecile Vo
(74) Attorney, Agent, or Firm — Garg Law Firm, PLLC; Rakesh Garg; Libby Z. Toub

(57) ABSTRACT

A method, system, and computer usable program product for deploying directory instances are provided in the illustrative embodiments. A configuration of an existing directory instance is cloned to the new directory instance. The existing directory instance may execute in a first data processing system and the new directory instance may execute in a second data processing system. A schema of the existing directory instance is cloned to the new directory instance. A determination is made whether the new directory instance is a peer of the existing directory instance. Data from the existing directory instance is cloned to the new directory instance if the new directory instance is a peer of the existing directory instance. The new directory instance is made operational in a directory topology.

17 Claims, 6 Drawing Sheets

DEPLOYING DIRECTORY INSTANCES

BACKGROUND OF THE INVENTION

1. Field of the Invention

The present invention relates generally to an improved data processing system, and in particular, to a computer implemented method for managing applications in data processing systems. Still more particularly, the present invention relates to a computer implemented method, system, and computer usable program code for deploying directory instances in a data processing environment.

2. Description of the Related Art

Many applications execute in a data processing environment in a distributed form. Distributed applications are software applications whose components can be executed on more than one data processing system across a network such that, to a user, all components appear to be working in unison as a complete application. For example, a user using a web-browser may access a website served by a web server. However, the content on that page may come from one or more databases, one or more applications executing on one or more application servers, and software components residing on the user's own computer. To the user, however, the webpage on the web-browser appears to have resulted from a single origin.

Another aspect of distributing applications is cloning some of the distributed components. Cloning a component is creating and executing more than one instances of the component. An instance is a copy, and an instance of a software or a component thereof is a copy of the software or the component. Often, among other uses, executing multiple instances of a component allow a user to increase the performance of the software application. For example, more instances may be handle more requests directed to the application simultaneously.

Often, cloning includes creating copies of not just the component but also of all or part of the data used by the component. As a part of the cloning process, data may be copied, or cloned, from an existing instance to another instance. The existing instance, from which the data is copied, is called a source instance. The instance to which the data is copied is called a target instance.

When cloned components and data exist in a data processing environment, the cloned components may have to be synchronized with each other. Synchronization involves ensuring that the various distributed components are up to date in relation with other components in the data processing environment. Synchronizing one instance may include copying, matching, updating, or modifying the information being synchronized in accordance with similar information in other instances. Synchronization of cloned components may also ensure that the data in some cloned components does not become obsolete, or the some components do not become out of step with other components.

A directory server implementing the lightweight directory access protocol (LDAP) is an example of a software that may be distributed and cloned in this manner. A directory is a hierarchical arrangement of information pertaining to users and systems in an organization. A directory server is a server in a data processing environment that provides a directory service. A directory service is a process by which a user in the data processing environment can retrieve details of a user or system from a directory server by providing a name of the user or system.

Directory servers may serve directories that are arranged according to a standard. One such standard is LDAP, which specifies a particular way of hierarchically organizing user information in a directory. A directory may be implemented using a standard, a variation of the standard, or by using a proprietary hierarchy. For example, a directory may be implemented using an X.500 directory server, which implements a directory standard of that name. A directory may also be implemented using a name server, or a user location service server (ULS server).

SUMMARY OF THE INVENTION

The illustrative embodiments provide a method, system, and computer usable program product for deploying directory instances. A configuration of an existing directory instance is cloned to the new directory instance. The existing directory instance may execute in a first data processing system and the new directory instance may execute in a second data processing system. A schema of the existing directory instance is cloned to the new directory instance. A determination is made whether the new directory instance is a peer of the existing directory instance. Data from the existing directory instance may be cloned to the new directory instance if the new directory instance is not a proxy of the existing directory instance. The new directory instance is made operational in a directory topology.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Illustrative embodiments provide a method, system, and computer usable program product for deploying directory instances. Illustrative embodiments recognize that presently, deploying new instances of an existing directory is largely a manual process. Presently, a user creates a new instance of a directory, and copies the data as well as configuration settings over to the new instance. The process of creating and populating an instance in this manner is called deploying an instance.

Illustrative embodiments recognize that when deploying instances of software that include cryptographic information, such as a directory, a manual process of deployment is prone to error and may introduce inconsistencies in the data processing environment. Cryptographic information is often complex and cumbersome to copy or recreate manually. For example, a cryptographic key may be a seemingly random string of characters that are sometimes several hundred characters long. Every single character has to be copied exactly and in the right place for the key to work in the cloned instance.

The illustrative embodiments further recognize that often, cryptographic information to be copied includes many additional components that not only have to be copied to the new instance but also modified so that the various instances may communicate with each other and operate as a single collective software. As an example, an instance of a directory includes cryptographic information that has to be synchronized with other instances of the directory for the directory as a whole to operate in an expected manner.

To address these and other problems related to distributing and cloning software components and data, the illustrative embodiments provide a method, system, and computer usable program product for deploying instances in a data processing environment. While the illustrative embodiments are described with respect to deploying directory instances, the illustrative embodiments may be used in conjunction with any application that may be distributed in a manner similar to distributing a directory.

For example, the illustrative embodiments may be implemented with an application server, a web server, a proxy server, a mail server, a feed server, or any other type of data server including databases. The illustrative embodiments may also be implemented with any business application, for example, with enterprise software, such as a manufacturing application, a planning application, a relationship management application, and a middleware application or platform. Additionally, the illustrative embodiments may be implemented in conjunction with a hardware component, such as in a firmware, as embedded software in a hardware device, or in any other suitable hardware or software form.

Any advantages of any illustrative embodiments listed herein are only exemplary and are not intended to be limiting on the illustrative embodiments. Additional advantages may be realized by specific illustrative embodiments. Furthermore, a particular illustrative embodiment may have some, all, or none of the advantages listed above.

Figure 1:
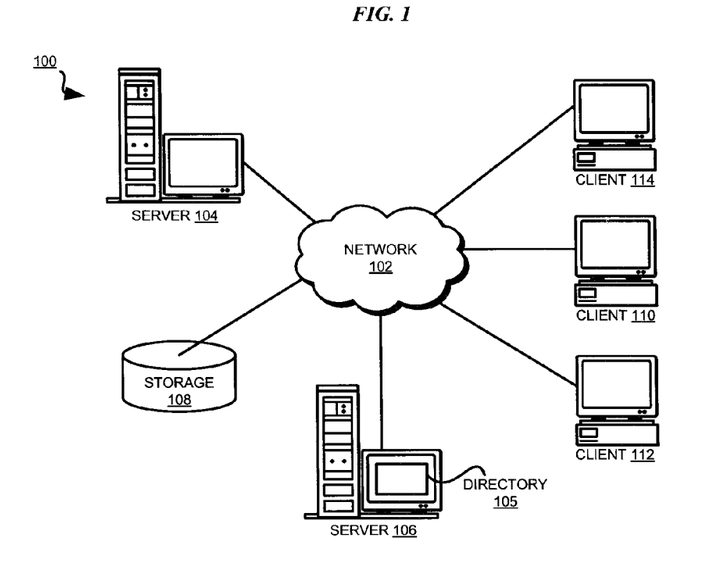
FIG. 1 depicts a pictorial representation of a network of data processing systems in which illustrative embodiments may be implemented.
Figure 2:
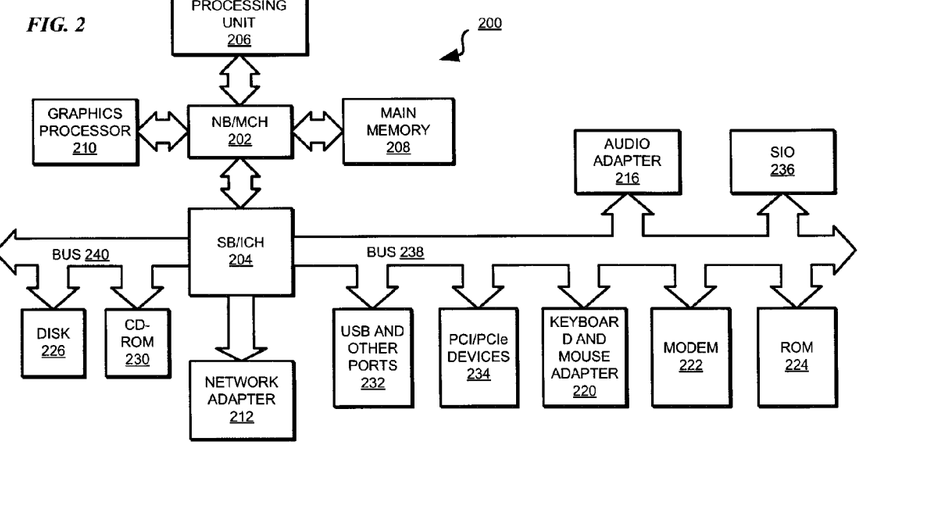
FIG. 2 depicts a block diagram of a data processing system in which illustrative embodiments may be implemented.

With reference to the figures and in particular with reference to FIGS. 1 and 2, these figures are exemplary diagrams of data processing environments in which illustrative embodiments may be implemented. FIGS. 1 and 2 are only exemplary and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Software applications may execute on any computer in data processing environment 100. Server 104 and server 106 couple to network 102 along with storage unit 108. In the depicted example, server 106 includes directory 105, which may be an exemplary software application executing on server 106, in conjunction with which the illustrative embodiments may be implemented. In addition, clients 110, 112, and 114 couple to network 102. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
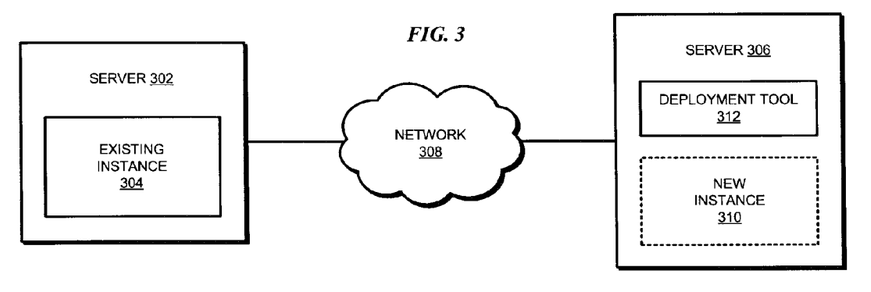
FIG. 3 depicts a block diagram of deploying a new instance in accordance with an illustrative embodiment.

With reference to FIG. 3, this figure depicts a block diagram of deploying a new instance in accordance with an illustrative embodiment. Server 302 may be a data processing system in a data processing environment, such as server 106 in FIG. 1. Instance 304 may be an existing instance that a user may wish to clone and deploy elsewhere in the data processing environment. For example, instance 304 may be an existing instance of a directory, such as directory 105 in server 106 in FIG. 1.

Server 306 may be another data processing system in the data processing environment. Any of servers 302 and 306 may be any kind of data processing systems, such as server 104 or 106, or client 110, 112, or 114 in FIG. 1. Servers 302 and 306 may communicate with each other over network 308, which may be analogous to network 102 in FIG. 1.

Instance 310 may be a new instance that the user may wish to create on server 306 by cloning instance 304. For example, if instance 304 were an existing instance of a directory, the user may wish to create a new instance of the directory as instance 310. Deployment tool 312 may be a software, hardware, or a combination thereof in accordance with an illustrative embodiment to facilitate the deployment of instance 304 to instance 310 by cloning.

Figure 4:
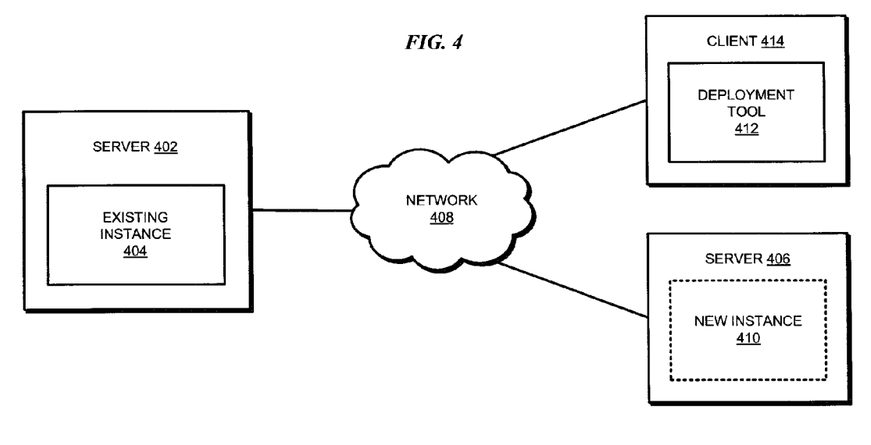
FIG. 4 depicts a block diagram of an alternate configuration in deploying a new instance in accordance with an illustrative embodiment.

With reference to FIG. 4, this figure depicts a block diagram of an alternate configuration in deploying a new instance in accordance with an illustrative embodiment. Server 402 may be a data processing system in a data processing environment, such as server 106 in FIG. 1. Instance 404 may be an existing instance that a user may wish to clone and deploy elsewhere in the data processing environment. For example, instance 404 may be an existing instance of a directory, such as directory 105 in server 106 in FIG. 1.

Server 406 may be another data processing system in the data processing environment. Any of servers 402 and 406 may be any kind of data processing systems, such as server 104 or 106, or client 110, 112, or 114 in FIG. 1. Servers 402 and 406 may communicate with each other over network 408, which may be analogous to network 102 in FIG. 1.

Instance 410 may be a new instance that the user may wish to create on server 406 by cloning instance 404. For example, if instance 404 were an existing instance of a directory, the user may wish to create a new instance of the directory as instance 410. Deployment tool 412 may be a software, hardware, or a combination thereof in accordance with an illustrative embodiment to facilitate the cloning of instance 404 to instance 410. Furthermore, deployment tool 412 may execute on a data processing system, client 414, that is separate from servers 402 and 406, but in communication with servers 402 and 406 over network 408. Client 414 may be implemented using any kind of data processing systems, such as server 104 or 106, or client 110, 112, or 114 in FIG. 1.

The scope of cloning an instance according to the illustrative embodiments may vary depending on the needs of a particular implementation. The varying scope of cloning an instance is explained here using cloning directory instances as an example for clarity. However, the illustrative embodiments are not limited to cloning directory instances.

As an example according to the illustrative embodiments, a directory instance may be cloned to a new instance such that the new instance serves as a peer instance of the existing instance, or a proxy instance of the existing instance. A peer instance of an existing instance of a directory is an instance that clones some or all of the data of the existing instance, and responds to directory requests and provides directory services similarly as the existing instance. A proxy instance of an existing instance of a directory is an instance that handles and redirects a directory request so that the existing instance, any replica peer instances of the existing instance, or any cloned peer instances of the existing instance may respond to the directory request or provide the requested directory services. A replica peer instance is also called a replica instance.

A replica instance of an existing instance is different from a cloned peer instance of the existing instance in that a clone is a onetime copy of an existing instance whereas a replica is an ongoing copy of the existing instance. A clone, such as a cloned peer instance, may be created as a snapshot of an existing instance at a particular time, and may be updated for currency from any source of updated information. A replica instance is a snapshot of an existing instance at a particular time, and receives ongoing updates from that existing instance so as to "replicate" that existing instance.

The illustrative embodiments in this disclosure are described with respect to deploying clones of existing instances only for clarity of the description and are not limited to deploying cloned instances. The illustrative embodiments are similarly and equally applicable to deploying replica instances and the same is contemplated within the scope of the illustrative embodiments.

In cloning an existing directory instance according to the illustrative embodiments, a user may have to create a new directory instance, and clone the schema of the existing instance. A schema is the information about the structure or organization of the data that an instance uses. In one embodiment, a user may be able to deploy a proxy instance in a data processing environment by performing these steps.

In cloning an existing directory instance to a new peer instance in accordance with the illustrative embodiments, the user may have to perform additional steps in conjunction with the creating the instance and creating the schema steps. For example, in one embodiment, the user may have to copy the data from the existing instance to the new peer instance. The user may copy the data using the schema the user may have created in a step described previously. Additionally, the user may have to regenerate cryptographic information for the new peer instance, such as by generating appropriate cryptographic keys for the new peer instance.

Furthermore, in a distributed environment, the user may also have to modify a topology. A topology of an application identifies the various instances of the application and its components in the distributed environment, and specifies their respective roles and interrelationships in the distributed environment. For example, in one embodiment, in a distributed directory, a directory topology may identify the various directory instances—peer instances as well as proxy instances. The directory topology may also provide information about how the directory's hierarchy of data is divided among the various instances, specify the roles of the various directory instances, and the interrelationships of those directory instances with each other.

Typically, in a directory topology, each server, to wit, each instance, may be identified by an identifier. The directory topology according to the illustrative embodiments may specify a role of an instance associated with an identifier. A role describes what an instance is supposed to do in the directory topology, such as, whether the instance is to act as a peer or a proxy.

A particular embodiment of a directory topology may also specify how a client application, a peer instance, a proxy instance, or some other application or component may connect to a particular instance. Another embodiment of the directory topology may further specify conditions under which a particular instance may be cloned, how the instance may be replicated, how the instance may be updated, how or when other actions may be performed with respect to the instance, or some combination thereof. For example, a peer instance may be directly updated with the updated data for the directory, such as by having an administrator add the data to a peer instance. Alternatively, the peer instance may receive the updated data from other peer instances. In contrast, a clone of a particular peer instance may receive an update when that particular peer instance is updated.

Figure 5:
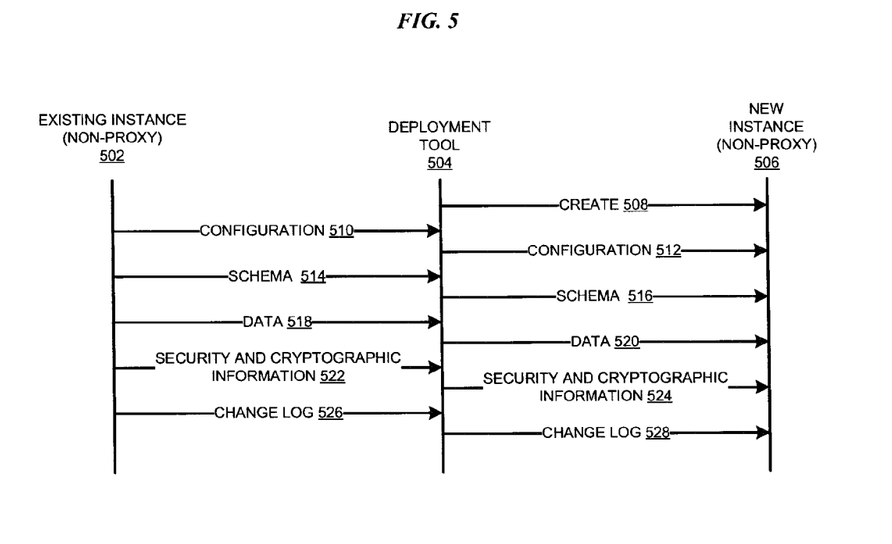
FIG. 5 depicts an interaction diagram for deploying new instances using the deployment tool in accordance with an illustrative embodiment.

With reference to FIG. 5, this figure depicts an interaction diagram for deploying new instances using the deployment tool in accordance with an illustrative embodiment. Existing instance 502 may be analogous to existing instance 404 in FIG. 4. Deployment tool 504 may be implemented using deployment tool 412 in FIG. 4. New instance 506 may be analogous to new instance 410 in FIG. 4. In this figure, the interactions are described with respect to non-proxy instances such that existing instance 502 is a peer instance and new instance 506 is a clone of that peer instance. Cloning of a peer instance is depicted for describing the additional interactions used in cloning a peer instance. A proxy instance may be similarly cloned by using a subset of the interactions depicted in FIG. 5.

Deployment tool 504 creates new instance 506 in create interaction 508. In one embodiment, create interaction 508 may include creating new instance 506 on a data processing system as well as creating or modifying one or more user accounts on the data processing system so that the one or more user accounts have access and authority to modify new instance 506.

Deployment tool 504 receives configuration 510 from existing instance 502. Deployment tool 504 provides configuration 512 to new instance 506 in order to configure new instance 506 as a clone of existing instance 502. Deployment tool 504 receives schema 514 from existing instance 502. Deployment tool 504 provides schema 516 to new instance 506. In one embodiment, deployment tool 504 may wait for receiving both configuration 510 and schema 514 from existing instance 502, and may provide configuration 512 and schema 516 together to new instance 506.

Deployment tool 504 receives data 518 from existing instance 502. Deployment tool 504 provides data 520 to new instance 506 to populate new instance 506 as a clone of existing instance 502. In one embodiment, interactions for receiving data 518 and sending data 520 may be omitted if the new instance is a proxy instance. In another embodiment, interactions for receiving data 518 and sending data 520 may be omitted if a user wishes the new instance to the settings and schema of existing instance 502 but not the data. Deployment tool 504 receives security and cryptographic information 522 from existing instance 502 and provides security and cryptographic information 524 to new instance 506. As a part of providing security and cryptographic information 524 to new instance 506, deployment tool 504 may generate new security and cryptographic information for new instance 506.

Deployment tool 504 receives change log 526 from existing instance 502 and provides change log 528 to new instance 506 to populate new instance 506 with the changes in the data of existing instance 502. A change log may include information about data changes that may have occurred during the cloning process, during a predefined period, since the enabling of change log, or changes meeting any other criterion suitable for a particular implementation. In one embodiment, interactions for receiving change log 526 and sending change log 528 may be omitted if the new instance is a proxy instance.

Deployment tool 504 may modify the information received from existing instance 502, such as the data, the security and cryptographic information, and the change log information, before sending such information to new instance 506 according to any implementation differences between existing instance 502 and 506. Furthermore, deployment tool 504 may permit a user to select a type of cloning. For example, the user may be able to specify using deployment tool 504 whether new instance 506 is to be created as a proxy instance or a peer instance; and further, if created as a peer instance, whether to create new instance 506 as a full or partial peer clone of existing instance 502. The user may be able to make these specifications using any type of interface, for example a graphical user interface, of deployment tool 504. Such an interface of deployment tool 504 may also allow the user to specify the user accounts and their authority parameters to manipulate new instance 506. Any other implementation specific user functions may be supported via such an interface of deployment tool 504 without departing from the scope of the illustrative embodiments.

In one embodiment, deployment tool 504 may schedule receiving change log 526 and sending change log 528 such that the changes made to existing instance 502 that may be relevant to new instance 506 are carried over to new instance 506. An implementation of deployment tool 504 of the illustrative embodiment may schedule, sequence, repeat, divide, or combine the depicted interactions, or perform additional interactions for cloning existing instance 502 without departing from the scope of the illustrative embodiment.

Figure 6:
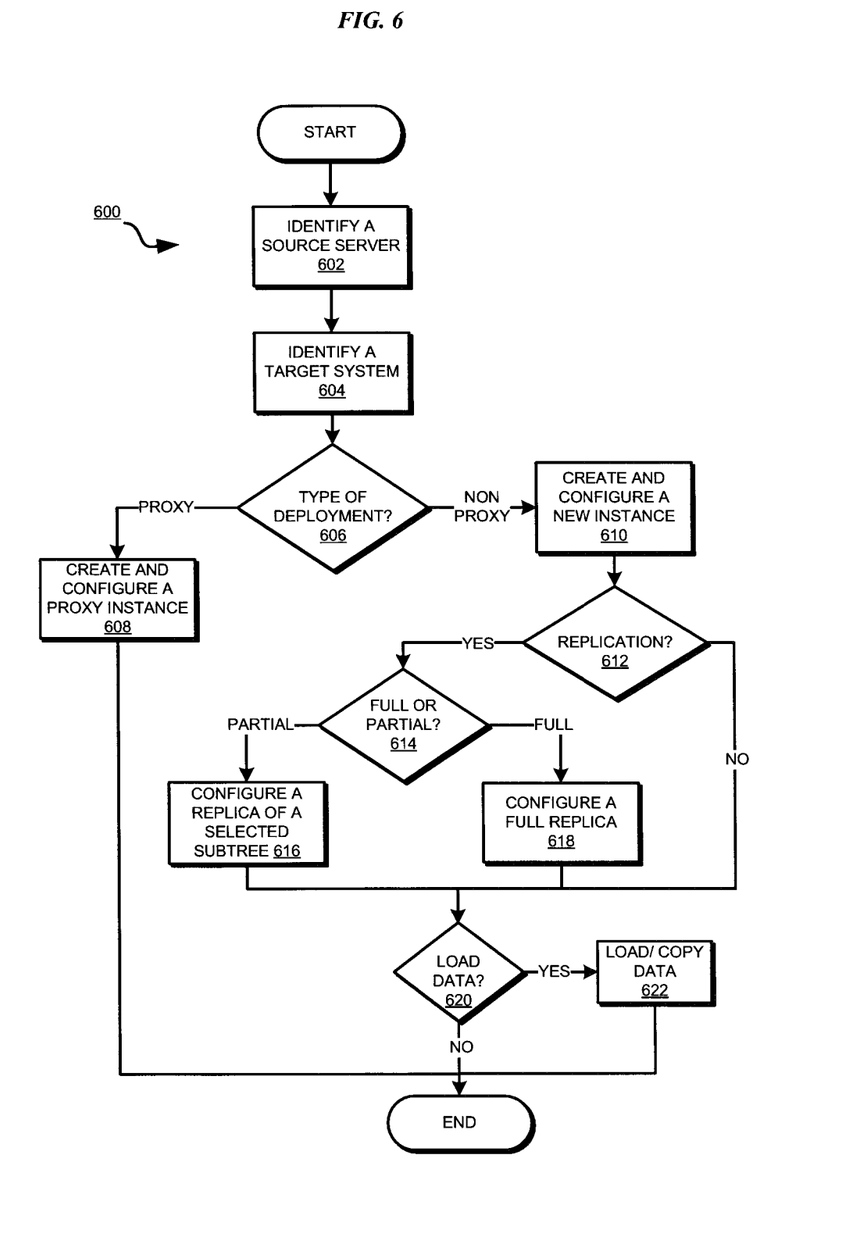
FIG. 6 depicts a flowchart of a process of deploying a new instance in accordance with an illustrative embodiment.

Additionally, implementation specific rules or logic may also be implemented in deployment tool 504. For example, in one embodiment, deployment tool 504 may include restrictions such that if a peer instance's replica is being cloned, the new clone of the existing replica may only have a role of a replica and receive its updates from the peer of the existing replica. In another embodiment, a restriction may be that a peer instance may be replicated as a new peer instance, a new replica instance, or a new proxy instance. Another embodiment may allow a new peer instance to be cloned from an existing replica instance. FIG. 6 illustrates an example of such logic that may be implemented in a deployment tool according to the illustrative embodiments.

With reference to FIG. 6, this figure depicts a flowchart of a process of deploying a new instance in accordance with an illustrative embodiment. Process 600 may be implemented using a deployment tool, such as deployment tool 504 in FIG. 5. Process 600 is described with respect to a directory instance only for the clarity of the description. The directory instance is only exemplary and is not limiting on the illustrative embodiment.

Process 600 begins by identifying a source server, such as an existing instance of a directory (step 602). Process 600 also identifies a target system, such as a data processing system where a new instance of the directory is to be created (step 604). Process 600 determines a type of deployment (step 606). As described above, a new instance may be deployed as a proxy instance, or a peer instance. Furthermore, a peer instance or its replica may copy all or part of the data hierarchy of the existing peer instance.

If process 600 determines that the new instance to be deployed is a proxy instance ("Proxy" path of step 606), process 600 creates and configures a proxy instance in the manner described above, such as by performing interactions 510, 512, 514, and 516 in FIG. 5, (step 608). Process 600 ends thereafter.

If process 600 determines that the new instance to be deployed is not a proxy instance ("Non-Proxy" path of step 606), process 600 creates and configures a new instance so that the new instance may be a replica or a cloned peer of the existing instance (Step 610). Process 600 then determines if the new instance to be deployed is to replicate the existing instance (step 612). If process 600 determines that the new instance is to replicate the existing instance ("Yes" path of step 612), process 600 determines if the replication is of full data hierarchy or a part of the data hierarchy (step 614).

If process 600 determines that the new instance to be deployed is to replicate a part of the data hierarchy of the existing instance ("Partial" path of step 614), process 600 configures a replica of a selected subtree (step 616). Process 600 proceeds to step 620. Selecting a subtree that is to be replicated from the data hierarchy, also known as a tree, may be a separate step in conjunction with step 612 and is not depicted in FIG. 6. A user may perform such a selection using an interface to the deployment tool.

If process 600 determines that the entire data hierarchy of the existing instance is to be replicated in the new instance ("Full" path of step 614), process 600 configures a full replica of the tree of the existing instance in the new instance (step 618). Process 600 proceeds to step 620

Returning to step 612, if process 600 determines that the new instance is not to be a replica of the existing instance ("No" path of step 612), process 600 determines if data from the existing instance is to be loaded or copied into the new instance (step 620). If process 600 determines that data is to be loaded ("Yes" path of step 620), process 600 loads the data into the new instance (step 622). Process 600 ends thereafter. If process 600 determines that data is not to be loaded in the new instance ("No" path of step 620), process 600 ends thereafter.

Figure 7:
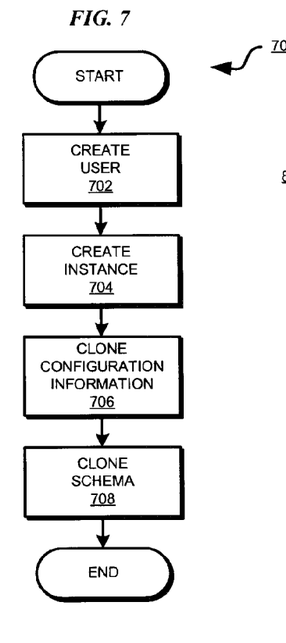
FIG. 7 depicts a flowchart of a process for creating a new proxy instance in accordance with an illustrative embodiment.

With reference to FIG. 7, this figure depicts a flowchart of a process for creating a new proxy instance in accordance with an illustrative embodiment. Process 700 may be implemented using a deployment tool, such as deployment tool 412 in FIG. 4.

Process 700 begins by creating a user (step 702). Process 700 creates an instance (step 704). The user created in step 702 may be a user account, such that the user has the authority to manipulate the instance created in step 704. The instance created in step 704 may be a new instance in a target data processing system. In one embodiment, step 704 may reuse and reconfigure an instance that may have been already created.

Process 700 clones the configuration information from an existing instance being cloned (step 706). Step 706 may include some of the interactions as described with respect to FIG. 5. Process 700 clones the schema, or a portion thereof, from the existing instance to the new instance (step 708). Again, step 708 may include some of the interactions as described with respect to FIG. 5. Process 700 ends thereafter.

Figure 8:
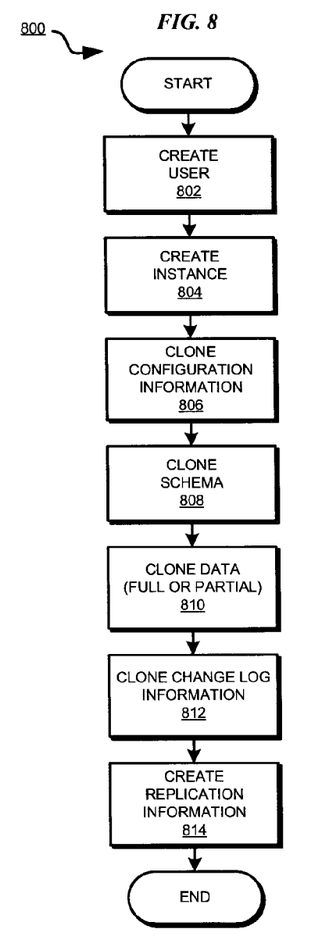
FIG. 8 depicts a flowchart of a process for cloning a peer instance in accordance with an illustrative embodiment.

With reference to FIG. 8, this figure depicts a flowchart of a process for cloning a peer instance in accordance with an illustrative embodiment. Process 800 may be implemented using a deployment tool, such as deployment tool 412 in FIG. 4.

Process 800 begins by creating a user (step 802). Process 800 crates an instance (step 804). The user created in step 802 may be a user account, such that the user has the authority to manipulate the instance created in step 804. The instance created in step 804 may be a new instance in a target data processing system. In one embodiment, step 804 may reuse and reconfigure an instance that may have been already created.

Process 800 clones the configuration information from an existing instance being cloned (step 806). Step 806 may include some of the interactions as described with respect to FIG. 5. Process 800 clones the schema, or a portion thereof, from the existing instance to the new instance (step 808). Again, step 808 may include some of the interactions as described with respect to FIG. 5.

Process 800 clones the data from the existing instance to the new instance created and configured in steps 802-808 (step 810). Step 810 may clone all or part of the data from the existing instance. For example, when cloning an existing peer directory instance, step 810 may clone only the data from a subtree of the existing peer directory instance. Alternatively, an implementation of process 800 may clone the entire hierarchy of data from the existing peer directory instance as described with respect to FIG. 6.

Process 800 clones the change log information to the new instance (step 812). Cloning the change log from the existing instance to the new instance in this manner may ensure that the changes applied to the existing instance during the cloning process, such as during the execution of steps 802-810, are applied to the new instance created using process 800.

Process 800 creates the replication information for the new instance thus created and populated (step 814). Process 800 ends thereafter. Step 814 may be performed at a different place in the flowchart of FIG. 8. For example, in one embodiment, replication information of step 814 may be created before the data is cloned to the new instance. In another embodiment, step 814 may be performed after the data is cloned. The steps of process 800 in general, including step 814, may be performed in a different order than depicted without departing from the scope of the illustrative embodiments.

Creating the replication information may include modifying a topology of instances in a distributed data processing environment. For example, in a distributed directory, the directory topology may be modified as described above to include the information about the new instance made available by steps 802-812 of process 800. Creating replication information as in step 814 may also include creating replication agreements with respect to the new instance. A replication agreement is a specification of the manner in which an instance in a topology receives updates or changes. In a replication agreement, an instance identified as a supplier instance supplies the updates, and an instance identified as a consumer instance receives the updates from the corresponding supplier instance.

Figure 9:
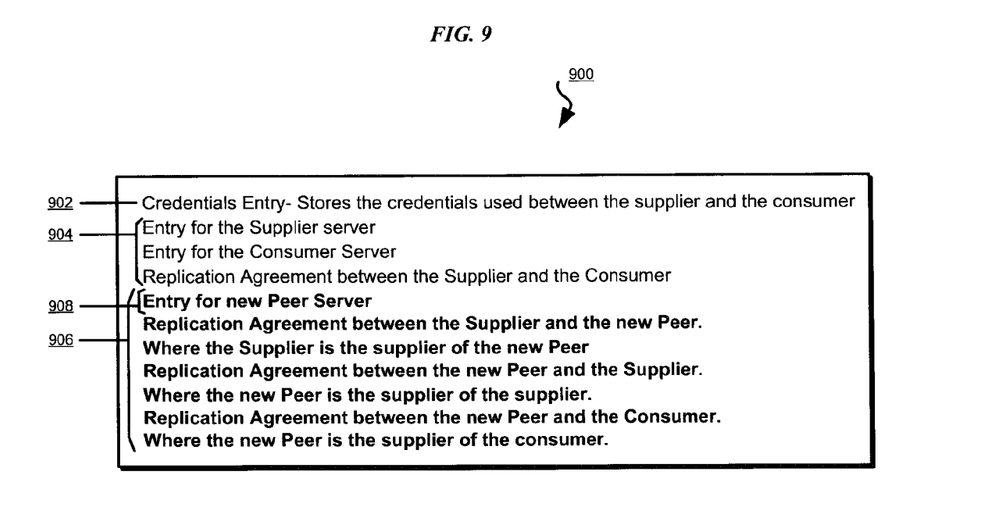
FIG. 9 depicts an exemplary replication agreement modified in accordance with an illustrative embodiment.

With reference to FIG. 9, this figure depicts an exemplary replication agreement modified in accordance with an illustrative embodiment. Modified replication agreement 900 may be modified by a deployment tool according to the illustrative embodiment, such as deployment tool 412 in FIG. 4, using a step for creating replication information, such as step 814 in FIG. 8.

A typical replication agreement, for example a directory replication agreement, may include information about any credentials that the various instances in the topology may use for interacting with one another. Entry 902 in modified replication agreement 900 represents entries that may specify the credentials of the various instances in a topology covered by a typical replication agreement. In one embodiment, the credentials in entry 902 may include one or more identifiers for an instance in the topology, one or more cryptographic information pertaining to the instance, one or more methods for communicating with the instance, and one or more relationships of the instance with other instances in the topology. Of course, entry 902 may include any other type of information relevant to the credentials of an instance in a given implementation without departing from the scope of the illustrative embodiments.

Modified replication agreement 900 may further include entries 904 where the various instances may be described. For example, entries 904 may include information about one or more supplier instances, one or more consumer instances, and information about one or more replication agreements between the supplier instances and the consumer instances.

Modified replication agreement 900 according to an illustrative embodiment may further include entries 906. Entries 906 may include information about a new instance that may have been added to the topology as described in this disclosure. As an example, modified replication agreement 900 shows entry 908 for a new peer server, to wit, a new peer instance cloned from an existing instance. Entries 906 may, similarly as in entries 904, contain information about one or more replication agreements with respect to the new peer instance identified in entry 908.

As an example, a replication agreement may be specified between a supplier instance in entries 904 and the new peer instance in entry 908, such that the existing supplier instance supplies updates to the new peer instance. As another example, a replication agreement may be specified between a supplier instance in entries 904 and the new peer instance in entry 908 such that the new peer instance supplies updates to the existing supplier instance. As another example, a replication agreement may be specified between a consumer instance in entries 904 and the new peer instance in entry 908 such that the new peer instance supplies updates to the consumer instance. Many other replication agreements will be conceivable from this disclosure and are contemplated within the scope of the illustrative embodiments.

Figure 10:
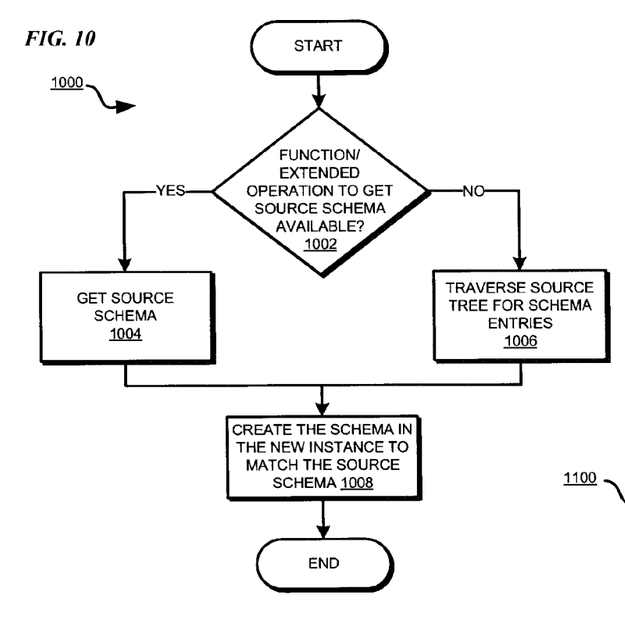
FIG. 10 depicts a flowchart of a process of cloning a schema in accordance with an illustrative embodiment.

With reference to FIG. 10, this figure depicts a flowchart of a process of cloning a schema in accordance with an illustrative embodiment. Process 1000 depicts steps that may be implemented as any of steps 708 in FIG. 7 or step 808 in FIG. 8.

Process 1000 begins by determining if a function, such as a "get file" extended operation in a directory, is available to get the schema of the existing instance (step 1002). The schema of an existing instance is also known as a source schema. If such a function is available ("Yes" path of step 1002), process 1000 uses the function to receive the source schema (step 1004). If, however, such a function is not available ("No" path of step 1002), process 1000 may traverse the hierarchy of the existing instance and determine the entries that may be used to construct a source schema (step 1006). Process 1000 creates a schema in the new instance to match the source schema either received or constructed (step 1008). Process 1000 ends thereafter.

Figure 11:
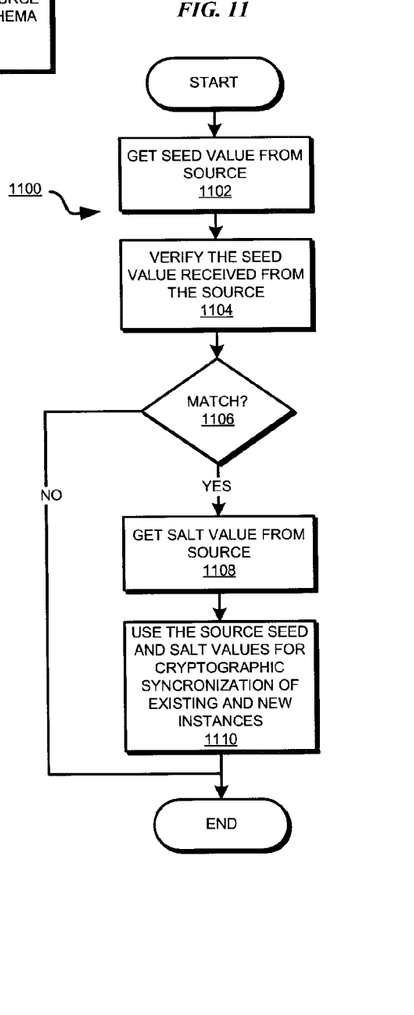
FIG. 11 depicts a flowchart of a process of creating the cryptographic information for a new instance in accordance with an illustrative embodiment.

With reference to FIG. 11, this figure depicts a flowchart of a process of creating the cryptographic information for a new instance in accordance with an illustrative embodiment. Process 1100 depicts steps that may form one of the ways in which interactions 522 and 524 in FIG. 5 may be implemented.

Process 1100 begins by receiving seed value from the existing instance (step 1102). A seed value is a numeric value used in the generation of cryptographic information, such as keys. As an example, an existing directory instance may store the seed value used in generating its cryptographic information, and that stored seed value may be received in step 1102. An illustrative embodiment may verify the seed value received in step 1102 against a repository that stores the seed values for the various instances executing in a data processing environment (step 1104). The verification of step 1104 may ensure that the seed value received in step 1102 is not corrupted or altered in a manner that may prevent process 1100 from generating usable cryptographic information for the new instance.

Process 1100 determines if the verification of step 1104 results in a match (step 1106). In step 1106, process 1100 determines whether the seed value received from an existing instance in step 1102 corresponds to a seed value stored for that existing instance in the repository used in step 1104. If, process 1100 determines that the seed value does not match ("No" path of step 1106), process 1100 ends.

In one embodiment, if the seed value does not match the seed value stored in the repository, process 1100 may generate an error message such that a user may take a corrective action. In another embodiment, if the seed value does not match the seed value stored in the repository, process 1100 may end as described above, leaving a schema, settings, and unencrypted data of an existing instance in the new instance but not the data that may be encrypted in the existing instance. In another embodiment, if the seed value does not match the seed value stored in the repository, process 1100 may remove any schema, settings, or data that may have been copied to the new instance before ending.

If, however, process 1100 determines that the seed value matches ("Yes" path of step 1106), process 1100 receives a salt value from the existing instance (step 1108). A salt value is a numeric value that is used in conjunction with the seed value in determining a cryptographic information, such as for generating a cryptographic key. Process 1100 uses the seed and salt values received in this manner to generate the cryptographic information for the new instance, such that the new and the existing instances are synchronized in their cryptographic information (step 1110). Process 1100 ends thereafter. An implementation of process 1100 may generate cryptographic information using the seed and salt values in conjunction with any suitable cryptographic algorithm without departing from the scope of the illustrative embodiments.

Figure 12:
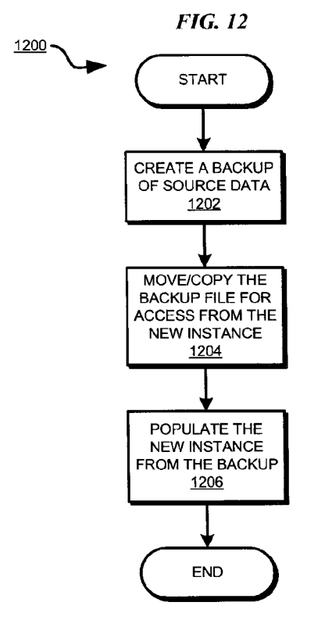
FIG. 12 depicts a flowchart of a process of populating data in a clone of a peer instance in accordance with an illustrative embodiment.

With reference to FIG. 12, this figure depicts a flowchart of a process of populating data in a clone of a peer instance in accordance with an illustrative embodiment. Process 1200 depicts steps that may be implemented as any of steps 612 or 614 in FIG. 6, or step 812 in FIG. 8.

Process 1200 begins by creating a backup of the data of the existing instance (step 1202). Process 1200 moves or copies the backup created in this manner to a location in the data processing environment where the new instance can access the backup files (step 1204). Process 1200 populates the schema created in the new instance, such as by using process 700 in FIG. 7, using the data from the backup files (step 1206). Process 1200 ends thereafter.

The components in the block diagrams and the steps in the flowcharts described above are described only as exemplary. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for deploying directory instances. By implementing the illustrative embodiments, a user may be able to use the lightweight directory access protocol to deploy new instances in a distributed directory environment. The illustrative embodiments allow a user to deploy a directory instance partly over LDAP and partly by using shared drives, such as by performing a backup of the data of the existing instance on a drive that is accessible to the new instance as well.

As distinct from methods for creating copies of databases and file systems, the illustrative embodiments may allow the user to clone an existing instance and propagate changes occurring in the existing instance or elsewhere to the new instance. The illustrative embodiments may also allow a user to maintain synchronization of the new instance with the rest of the instances as needed in a particular data processing environment, including synchronizing cryptographic information among instances.

The illustrative embodiments also allow the user to create new relationships between the new and existing instances. Thus, the user may be able to use the illustrative embodiments in conjunction with cloning a directory instance as well as instances of other types of organizations of data, such as databases.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method for deploying a new directory instance, the method comprising:
   cloning a configuration of an existing directory instance to the new directory instance, the existing directory instance executing in a first data processing system and the new directory instance executing in a second data processing system, wherein the existing directory instance and the new directory instance are each accessed according to a directory access protocol;
   cloning a schema of the existing directory instance to the new directory instance;
   determining whether the new directory instance is a peer of the existing directory instance;
   cloning data from the existing directory instance to the new directory instance responsive to the new directory instance being a peer of the existing directory instance;
   receiving a seed value from the existing directory instance;
   receiving a salt value from the existing directory instance;
   regenerating, using the seed value and the salt value, a new cryptographic information for the new directory instance, wherein the regenerating generates a new cryptographic key such that the new directory instance operates as a peer of the existing directory instance in the directory topology by using the new cryptographic key, and wherein the directory topology provides a first specification for use by an application to communicate with the new directory instance, and a condition that has to be satisfied for the existing directory instance to be cloned;
   using the seed value and the salt value in conjunction with a cryptographic algorithm used in the existing directory instance to generate cryptographic information in the new directory instance such that the existing directory instance and the new directory instance are cryptographically synchronized with each other; and
   making the new directory instance operational in a directory topology using the new cryptographic information for the new directory instance.

2. The method of claim 1, wherein, if the new directory instance is not a peer of the existing directory instance, configuring the new directory instance as a proxy instance.

3. The method of claim 1, further comprising:
   modifying a user account in the second data processing system to allow the user account to manipulate the new directory instance; and
   creating the new instance to execute in the data processing system.

4. The method of claim 1, wherein cloning the schema is traversing a data organization in the existing directory instance, identifying schema entries in the data organization, and creating a new schema in the new directory instance, and wherein the schema and the configuration are distinct components of the existing directory instance.

5. The method of claim 1, wherein cloning the data further comprises cloning, from a data organization of the existing directory instance, data of a part of the data organization to the new instance, forming cloned data.

6. The method of claim 5, wherein the cloning the cloned data further comprises:
   creating a backup file of the data from the data organization of the existing directory instance;
   making the backup file available to the new directory instance; and
   loading the data from the backup file into the new directory instance.

7. The method of claim 1, wherein cloning the data further comprises cloning a change log of the existing directory instance to the new directory instance.

8. The method of claim 1, wherein the regenerating generates a new cryptographic key such that the new directory instance operates as a peer of the existing directory instance in the directory topology by using the new cryptographic key, and wherein the directory topology provides a first specification for use by an application to communicate with the new directory instance, and a condition that has to be satisfied for the existing directory instance to be cloned.

9. The method of claim 1, wherein cloning the data further comprises modifying a replication agreement to result in a modified replication agreement such that the modified replication agreement includes information about at least one relationship between the new directory instance and an other instance.

10. The method of claim 9, where the other instance is a receiver of updates from the new directory instance.

11. A computer usable program product comprising a computer usable storage device including computer usable code for deploying directory instances, the computer usable code comprising:
    computer usable code for cloning a configuration of an existing directory instance to a new directory instance, wherein the cloning is a one-time snapshot of a component of the existing directory instance to create a corresponding component of the new directory instance, the existing directory instance executing in a first data processing system and the new directory instance executing in a second data processing system, wherein the existing directory instance and the new directory instance are each accessed according to a directory access protocol;
    computer usable code for cloning a schema of the existing directory instance to the new directory instance;

computer usable code for determining whether the new directory instance is a peer of the existing directory instance;

computer usable code for cloning data from the existing directory instance to the new directory instance responsive to the new directory instance being a peer of the existing directory instance, and configuring the new directory instance as a proxy instance if the new directory instance is not a peer of the existing directory instance;

computer usable code for receiving a seed value from the existing directory instance;

computer usable code for receiving a salt value from the existing directory instance;

computer usable code for regenerating, using the seed value and the salt value, a new cryptographic information for the new directory instance, wherein the computer usable code for regenerating generates a new cryptographic key such that the new directory instance operates as a peer of the existing directory instance in the directory topology by using the new cryptographic key, and wherein the directory topology provides a first specification for use by an application to communicate with the new directory instance, and a condition that has to be satisfied for the existing directory instance to be cloned;

computer usable code for using the seed value and the salt value in conjunction with a cryptographic algorithm used in the existing directory instance to generate cryptographic information in the new directory instance such that the existing directory instance and the new directory instance are cryptographically synchronized with each other; and computer usable code for making the new directory instance operational in a directory topology using the new cryptographic information for the new directory instance.

12. The computer usable program product of claim 11, further comprising:

computer usable code for modifying a user account in the second data processing system to allow the user account to manipulate the new directory instance; and computer usable code for creating the new instance to execute in the second data processing system.

13. The computer usable program product of claim 11, wherein the schema and the configuration are distinct components of the existing directory instance, wherein the computer usable code for cloning the schema includes computer usable code for traversing a data organization in the existing directory instance, identifying schema entries in the data organization, and creating a new schema in the new directory instance, wherein the computer usable code for cloning the data further comprises computer usable code for cloning, from a data organization of the existing directory instance, data of a part of the data organization, forming cloned data, to the new instance, and computer usable code for cloning a change log of the existing directory instance to the new directory instance, and wherein the computer usable code for cloning the cloned data further comprises:

computer usable code for creating a backup file of the cloned data from the data organization of the existing directory instance;

computer usable code for making the backup file available to the new directory instance; and computer usable code for loading the cloned data from the backup file into the new directory instance.

14. The computer usable program product of claim 11, wherein the computer usable code for cloning the data further comprises computer usable code for modifying a replication agreement to result in a modified replication agreement such that the modified replication agreement includes information about at least one relationship between the new directory instance and an other instance, and wherein the other instance is a receiver of updates from the new directory instance.

15. A data processing system for deploying directory instances, the data processing system comprising:

a storage device, wherein the storage device stores computer usable program code; and a processor, wherein the processor executes the computer usable program code, and wherein the computer usable program code comprises:

computer usable code for modifying a user account in a second data processing system to allow the user account to manipulate a new directory instance; and computer usable code for creating the new instance to execute in the second data processing system;

computer usable code for cloning a configuration of an existing directory instance to the new directory instance, wherein the cloning is a one-time snapshot of a component of the existing directory instance to create a corresponding component of the new directory instance, the existing directory instance executing in a first data processing system and the new directory instance executing in the second data processing system, wherein the existing directory instance and the new directory instance are each accessed according to a directory access protocol;

computer usable code for cloning a schema of the existing directory instance to the new directory instance;

computer usable code for determining whether the new directory instance is a peer of the existing directory instance;

computer usable code for cloning data from the existing directory instance to the new directory instance responsive to the new directory instance being a peer of the existing directory instance, and computer usable code for configuring the new directory instance as a proxy instance if the new directory instance is not a peer of the existing directory instance;

computer usable code for receiving a seed value from the existing directory instance;

computer usable code for receiving a salt value from the existing directory instance;

computer usable code for regenerating, using the seed value and the salt value, a new cryptographic information for the new directory instance, wherein the computer usable code for regenerating generates a new cryptographic key such that the new directory instance operates as a peer of the existing directory instance in the directory topology by using the new cryptographic key, and wherein the directory topology provides a first specification for use by an application to communicate with the new directory instance, and a condition that has to be satisfied for the existing directory instance to be cloned;

computer usable code for using the seed value and the salt value in conjunction with a cryptographic algorithm used in the existing directory instance to generate cryptographic information in the new directory instance such that the existing directory instance and the new directory instance are cryptographically synchronized with each other; and computer usable code for making the new directory instance operational in a directory topology using the new cryptographic information for the new directory instance.

16. The data processing system of claim 15, wherein the schema and the configuration are distinct components of the existing directory instance, wherein the computer usable code for cloning the schema comprises: computer usable code for traversing a data organization in the existing directory instance, identifying schema entries in the data organization, and creating a new schema in the new directory instance.

17. The data processing system of claim 15, wherein the computer usable code for cloning the data further comprises computer usable code for modifying a replication agreement to result in a modified replication agreement such that the modified replication agreement includes information about at least one relationship between the new directory instance and an other instance, and wherein the other instance is a receiver of updates from the new directory instance.

* * * * *